United States Patent [19]

Tsunoda et al.

[11] Patent Number: 4,668,004
[45] Date of Patent: May 26, 1987

[54] INSTRUMENT PANEL CONSTRUCTION

[75] Inventors: Katsuya Tsunoda, Yokohama; Hiroo Okuyama, Isehara, both of Japan

[73] Assignee: Nissan Motor Co., Ltd., Yokohama, Japan

[21] Appl. No.: 640,694

[22] Filed: Aug. 14, 1984

[30] Foreign Application Priority Data

Aug. 18, 1983 [JP] Japan .................. 58-126798[U]

[51] Int. Cl.$^4$ .................. B60H 1/00; B60S 1/58
[52] U.S. Cl. .................. 296/70; 180/90; 280/752; 98/2.04
[58] Field of Search .................. 296/70, 72; 280/752; 180/90; 98/2, 2.04, 2.09, 2.16, 2.19, 114

[56] References Cited

U.S. PATENT DOCUMENTS

| 1,524,145 | 1/1925 | Mitchell | 98/114 |
| 3,864,889 | 2/1975 | Hobbs | 98/114 X |
| 4,456,640 | 6/1984 | Nishihara | 296/70 X |

FOREIGN PATENT DOCUMENTS

| 57-59207 | 4/1982 | Japan . | |
| 2032363 | 5/1980 | United Kingdom | 296/70 |

Primary Examiner—Robert B. Reeves
Assistant Examiner—Russell D. Stormer
Attorney, Agent, or Firm—Schwartz, Jeffery, Schwaab, Mack, Blumenthal & Evans

[57] ABSTRACT

An instrument panel construction includes an instrument panel main body and a padding having a pad with a skin thereon. The main body and the padding are formed with openings mating with each other for receiving a finisher, such as a side defroster grille. The padding has a reduced thickness portion around the opening thereof. The reduced thickness portion is slotted to expose the instrument panel main body. The finisher includes latch devices which engage with edge defining the opening of the instrument panel main body. A plurality of abutment ribs extend between said instrument panel main body via the slotted portions and said finisher.

7 Claims, 6 Drawing Figures

INSTRUMENT PANEL CONSTRUCTION

BACKGROUND OF THE INVENTION

The present invention relates to an instrument panel construction including an instrument panel and a finisher, such as a side defroster grille, received in an opening formed through the instrument panel.

A conventional instrument panel construction is shown in FIG. 1 as generally designated by the reference numeral 1. Referring also to FIGS. 2 and 3, an instrument panel includes an instrument panel main body 2 with a padding thereon whcih includes a pad 4 covered with a skin 3. A finisher, for example, a side defroster grille 7, is received in an opening 5 formed through the instrument panel main body 2 and an opening 6 formed through the pad 4 and the skin 3.

Hereinafter, the finisher is represented by the side defroster grille 7 for the sake of clarity although it is not intended to limit the term "finisher" to the side defroster grille 7. A plurality, four in this embodiment, of claws 8 are securely attached to legs 9 projecting downward, as viewed in FIG. 3, from the side defroster grille 7. The side defroster grille 7 is mounted on the instrument panel by inserting the legs 9 with the claws 8 into the openings 6 and 5 until it assumes a phantom line illustrated position wherein the claws 8 engage with an edge 5a defining the opening 5 and a first contacting surface abuts against a recessed surface 6a on a reduced thickness portion 4a of the padding including the pad 4 with the skin 3 thereon. The reduced thickness portion 4a extends around and defines the opening 6. In other words, in the phantom line illustrated position, the reduced thickness portion 4a is sandwiched between the claws 8 and the contacting surface 10.

This conventional mounting structure presents a problem that since the thickness of the reduced thickness portion 4a varies from one instrument panel to another, there is a possibility that the side defroster grille 7 may not be mounted properly or may become loose even if mounted.

The variation in thickness of the reduced thickness portion 4a is attributed to the manufacturing process of the padding including the pad covered with the skin.

Commonly, the skin 3 is formed by slash molding. According to the slash molding process, blended paste resin, a material of the skin, is poured into a cup like female mold and stretched out thin along the inner wall of the mold. That portion of the blended paste resin which is adhered to the mold inner wall is soldified. Leaving this soldified portion, the remainder is discharged from the mold. After being subjected to appropriate forming process, the soldified portion is removed from the mold and processed into the skin 3. In order to integrate the pad 4 with the skin 3, the skin 3 is positioned within a foaming mold and then foaming resin, a material of the pad, is injected into the back of the skin 3 and is subjected to foaming. The integrated pad and skin is then removed from the mold as a product. Because it is formed in the above mentioned manner, the dimensional control, in thickness, of the skin is very difficult. This is because the material within the mold has a rough surface, thus requiring smoothing out the surface with a brush and/or a knife to an even thickness which work relies on man's perception. The pad 4, on the other hand, is subjected to variation with temperature, making dimensional control of the pad difficult.

Therefore, if the reduced thickness portion 4a of the padding has a thickness deviated from a preset designed value, a distance (A) between a point where each of the claws 8 engages the edge 5a and a point where the contacting surface 10 abuts against the reduced thickness portion 4a varies. Thus, it is often experienced that the reduced thickness portion 4a cannot be placed fit between the claws 8 and the contacting surface 10, resulting in that the grille 7 is not mounted properly or it tends to become loose even if mounted.

In order to alleviate the above mentioned problem, Laid-open Japanese Utility Model Application No. 57-59207 teaches to remove the pad at the reduced thickness portion which is adapted to be sandwiched between the contacting surface and the claws. Although, with this teaching, the dimensional deviation owing to the pad is avoided, the dimensional deviation in the range from 1 to 3 mm owing to the slash forming of the skin cannot be avoided. Thus, there still is a possibility that the side defroster grille may not be properly mounted or may become loose even if mounted.

SUMMARY OF THE INVENTION

On the recognition of the above mentioned problem experienced in the prior art, an object of the present invention is to provide an instrument panel construction including an instrument panel and a padding including a pad with a skin that is formed by slash forming, which instrument panel construction ensures that a finisher be mounted properly on the instrument panel and thus prevents the finisher from becoming loose.

According to the present invention, there is provided an instrument panel construction wherein a padding including a pad with a skin thereon has a reduced thickness portion around an opening thereof. The reduced thickness portion is slotted to expose an instrument panel main body at a plurality of portions. A finisher has a contacting surface abutting against the reduced thickness portion of the padding and claws engaging an edge defining an opening formed through the instrument panel main body. A plurality of abutment ribs extend between the instrument panel main body via the slotted portions and the finisher at the contacting surface thereof.

DESCRIPTION OF THE PREFERRED EMBODIMENTS

Figure 1:
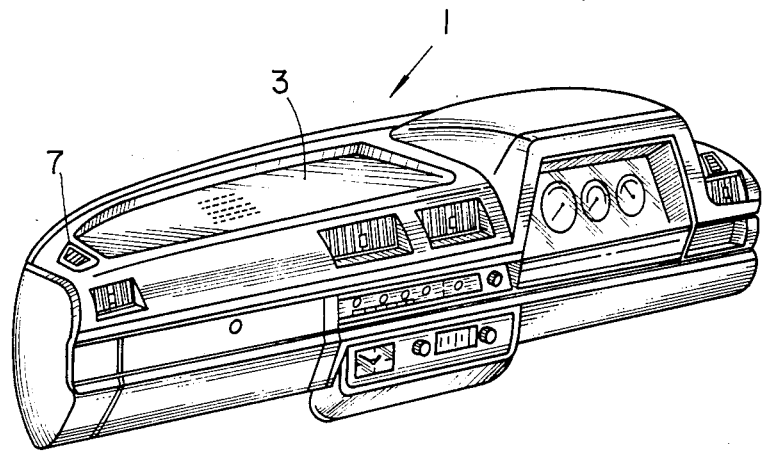
FIG. 1 is a perspective view showing an instrument panel as a whole.
Figure 2:
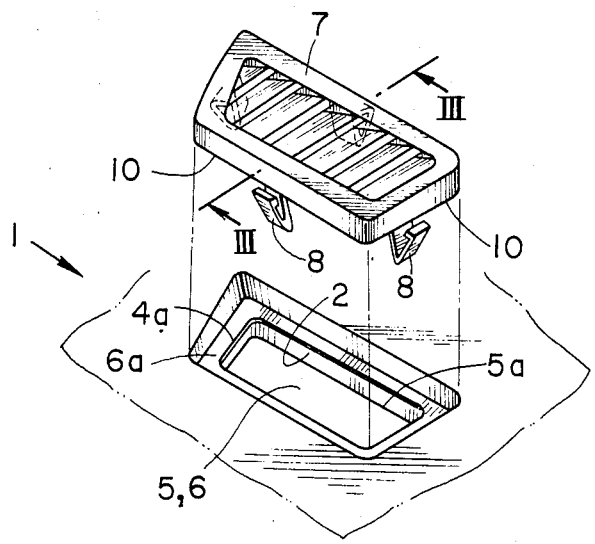
FIG. 2 is a perspective view of a side defroster grille as exploded from the instrument panel.
Figure 3:
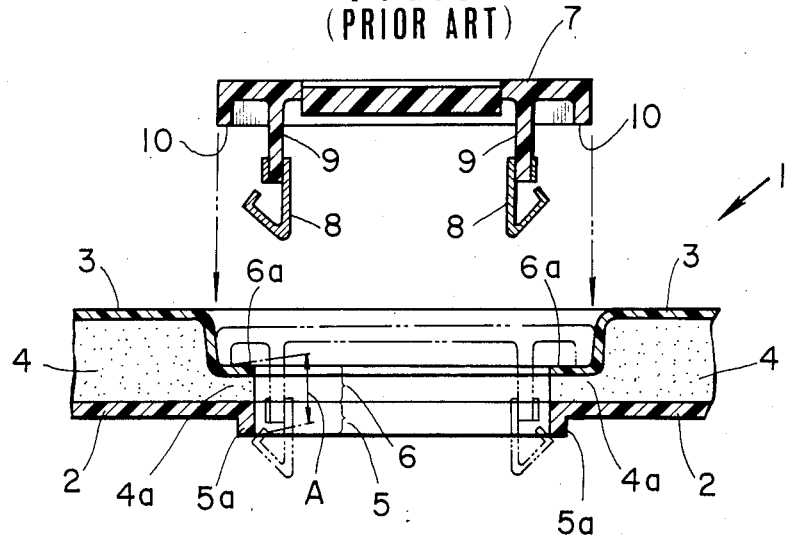
FIG. 3 is an enlarged sectional view taken through line II—II of FIG. 2.

The preferred embodiments are hereinafter described referring to FIGS. 4 to 6 wherein like reference numerals are used to designate like parts used in FIGS. 1 to 3 and description of these like parts is omitted for the sake of brevity.

Figure 4:
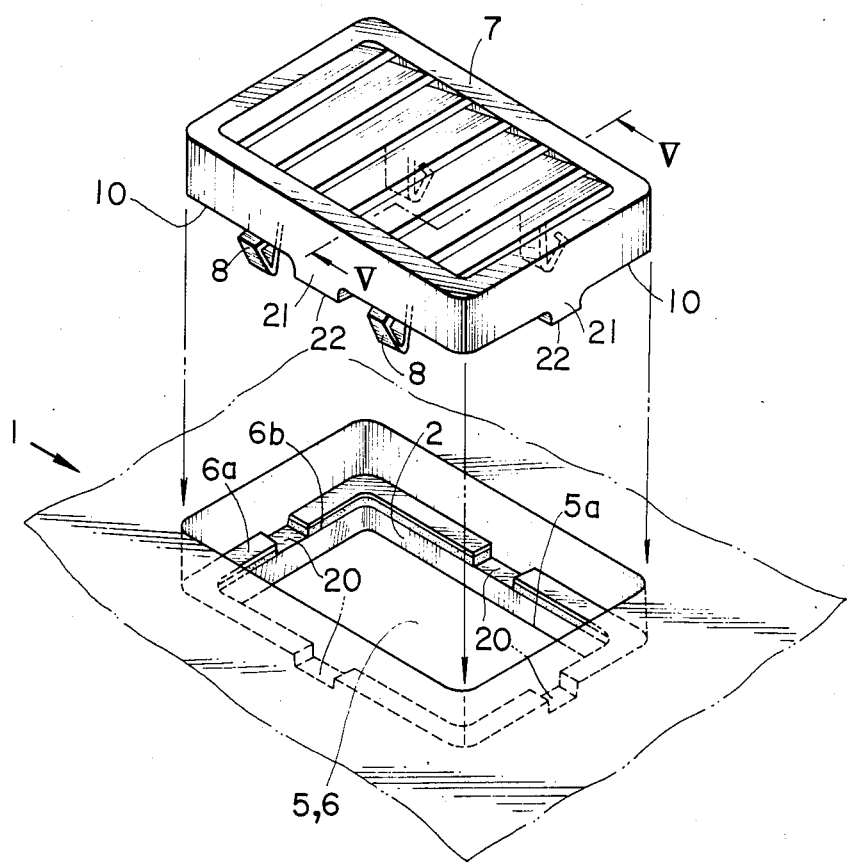
FIG. 4 is a similar view to FIG. 2 showing a first embodiment according to the present invention.
Figure 5:
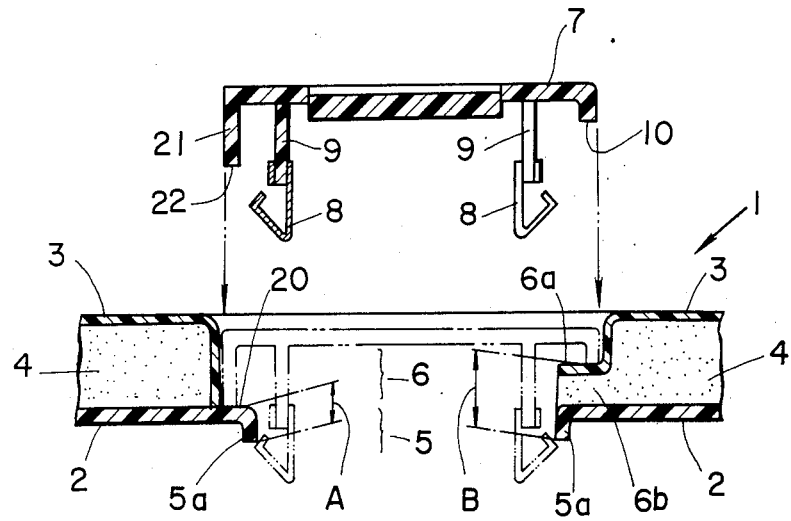
FIG. 5 is an enlarged sectional view taken through line V—V of FIG. 4.

Referring to FIGS. 4 and 5, an instrument panel construction 1 has an instrument panel main body 2 and a padding including a pad 4 with a skin 3 thereon. The instrument panel main body 2 is formed with an opening 5 and has an edge 5a around and defining the opening 5. The padding is formed with an opening 6 and has a reduced thickness portion 6b with a surface 6a which is recessed from the general surface of the padding. The reduced thickness portion 6b surrounds and defines the opening 6. The reduced thickness portion 6b is slotted so as to expose the instrument panel main body 2 at a plurality of portions designated by the reference numerals 20. The number of these portions 20 are four in this embodiment. The instrument panel construction 1 includes a finisher in the form of a side defroster grille 7 in this embodiment. The side defroster grille 7 has claws 8 on downward projecting legs 9, the claws 8 being adapted to engage with the edge 5a around the opening 5. For ensuring firm engagement of the claws 8 with the edge 5a, a plurality, four in this embodiment, of abutment ribs 21 are provided. In the phantom line illustrated position in FIG. 5, the ribs 21 extend between the instrument panel main body 2 via the slotted portions 20 of the reduced thickness portion 6b and the side defroster grille 7 at the contacting surface 10 thereof. The ribs 21 have upper ends integral with the side defroster grille 7 and lower ends having contacting surfaces 22 adapted to abut against the instrument panel main body 2. At the slotted portions 20, not only the pad 4 but also the skin 3 are removed. The remaining portion of the recessed reduced thickness portion 6b has the pad 4 and the skin 3 in the conventional manner. The projecting length of each of the ribs 21 from the contacting surface 10 is generally equal to the thickness of the reduced thickness portion 6b of the padding including the pad 4 and the skin 3.

In mounting, the side defroster grille 7 is pressed into the opening 5 of the instrument panel main body 2 until claws 8 on the legs 9 engage with the edge 5a and the contacting surfaces 22 formed on the ribs 21 are bought into abutting engagement with the exposed sections 20, respectively. Since the instrument panel main body 2 which is exposed at the slotted portions 20 is hard as compared to the skin 3 or the pad 4, a distance (A) between a point where each of the claws 8 engages with the edge 5a and a point where each of the contacting surfaces 22 of the ribs 21 abuts against the exposed instrument panel main body 2 does not vary from one instrument panel to another. At the remaining portion of the reduced thickness portion 6b, the contacting surface 10 of the side defroster grille 7 abuts against the skin 3 on the pad 4. Even if a dimensional deviation exists in a distance (B) between a point where each of the claws 8 engages with the edge 5a and a point where the contacting surface 10 abuts with the skin 3 at the remaining portion of the reduced thickness portion 6b, the firm engagement of the claws 8 with the edge 5a is ensured by the ribs 21.

Figure 6:
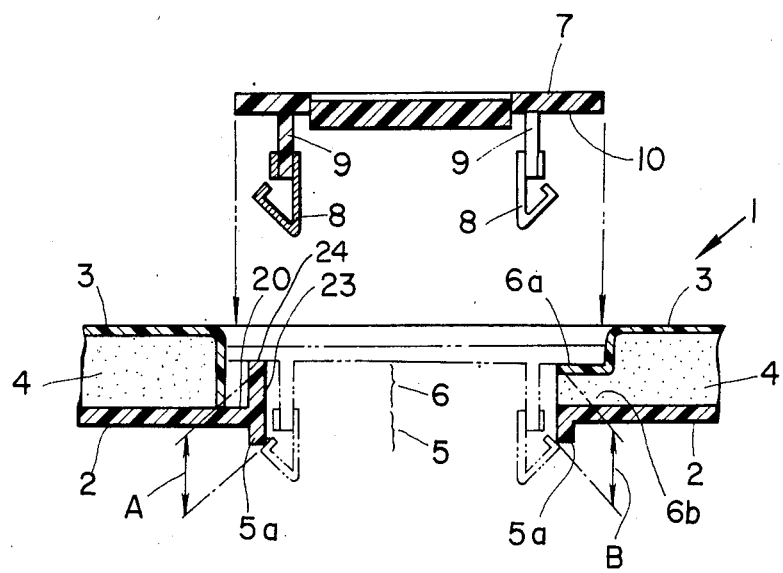
FIG. 6 is a similar view to FIG. 5 showing a second embodiment according to the present invention.

Referring to FIG. 6, a second embodiment is described. This embodiment is substantially similar to the first embodiment except that ribs 23 are formed on an instrument panel main body 2 and they are adapted to abut against a side defroster grille 7 at a contacting surface 10. The ribs 23 have lower ends integral with the instrument panel main body 2 and upper ends formed with contacting surfaces 24 adapted to abut against the side defroster grille 7 at a contacting surface 10 thereof.

With the instrument panel construction according to the present invention, since the reduced thickness portion of the padding is slotted to expose the instrument panel main body at the plurality of portions and the abutment ribs extend between the instrument panel main body and the finisher, the dimensional control of the distance A between the engagement point of each of the claws of the finisher and the abutting point of each of the surfaces on the ends of the ribs becomes easy because the dimensional accuracy of the instrument panel main body is ensured. This ensures secure mounting of the finisher, preventing the finisher from becoming loose.

What is claimed is:

1. An instrument panel construction comprising:
   an instrument panel main body with an opening and an edge defining said opening;
   a padding including a pad with a skin thereon secured on the instrument panel main body, said padding being formed with an opening mating with said opening of said instrument panel main body;
   said padding being reduced in thickness around said opening thereof and slotted through the reduced thickness to expose said instrument panel main body at a plurality of portions thereby to define a plurality of reduced thickness portions divided by said slotted portions;
   a finisher having a periphery in resilient contact with said reduced thickness portions of said padding, said finisher having claws which engage with said edge of said instrument panel main body; and
   a plurality of abutment ribs extending between said periphery and said instrument panel main body via said slotted portions of said padding so as to secure engagement of said claws with said edge of said instrument panel main body.

2. An instrument panel construction as claimed in claim 1, wherein each of said abutment ribs has one end thereof integral with said finisher and an opposite end abutting against said instrument panel main body.

3. An instrument panel construction as claimed in claim 1, wherein each of said abutment ribs has one end integral with said instrument panel main body and an opposite end abutting against said finisher.

4. An instrument panel construction as claimed in claim 2, wherein said finisher has four sides, and wherein an abutment rib is positioned at a central portion of each side of said finisher.

5. An instrument panel construction as claimed in claim 4, wherein said finisher is a grille.

6. An instrument panel construction as claimed in claim 1, wherein said edge of said instrument panel main body opening is substantially perpendicular to said instrument panel main body.

7. An instrument panel construction as claimed in claim 1, wherein said abutment ribs are integral with said edge of said instrument panel main body opening, said edge and said ribs being substantially perpendicular to said instrument panel main body.

* * * * *